(12) United States Patent
Krtolica (10) Patent No.: US 6,788,814 B1
(45) Date of Patent: Sep. 7, 2004

(54) GRAPH BASED THINNING OF GRAPHICAL OBJECTS

(75) Inventor: Radovan V. Krtolica, Los Gatos, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 731 days.

(21) Appl. No.: 09/678,496

(22) Filed: Oct. 2, 2000

Related U.S. Application Data (63) Continuation of application No. 09/661,865, filed on Sep. 14, 2000.

(51) Int. Cl.[7] .................................................. G06K 9/34

(52) U.S. Cl. ....................... 382/173; 382/177; 382/180

(58) Field of Search ........................ 382/173, 177–179, 382/180–190, 197, 201, 245; 358/1.9, 467; 717/144

(56) References Cited

U.S. PATENT DOCUMENTS

| | | | | |
|---|---|---|---|---|
| 5,025,479 A | | 6/1991 | Pastor ......................... | 382/227 |
| 5,067,165 A | | 11/1991 | Nishida ....................... | 382/195 |
| 5,539,840 A | * | 7/1996 | Krtolica et al. .............. | 382/195 |
| 5,583,949 A | * | 12/1996 | Smith et al. ................. | 382/199 |
| 5,644,648 A | | 7/1997 | Bose ........................... | 382/177 |

FOREIGN PATENT DOCUMENTS

EP 0949579 * 10/1999

OTHER PUBLICATIONS

Krtolica, "Box Connectivity Approach to Multifont Character Recognition", Proceeding of SPIE—The International Society for Optical Engineering 1994, pp. 315–321.*

Li, "Skeletonizing by compressed line adjacency graph in two directions", IEEE Signal Process. Soc, 1996, pp. 17–20 vol. 3.*

Krtolica, "Learning character recognition by localized interpretation of character–images", IEEE Signal Process. Soc, 1997, pp. 292–295 vol. 3.*

Krtolica, "Two–Stage box Connectivity Algorithm for Optical Character Recognition", IEEE Comput. Soc. Press, 1993, pp. 179–182.*

Author unknown, "Standardization of Group 3 Fascimile Terminals For Document Transmission", International Telecommunication Union, Recommendation T.4, Apr. 1999.

Author unknown, "Facsimile Coding Schemes and Coding Control Functions for Group 4 Facsimile Apparatus", International Telecommunication Union, Recommendation T.6, 1988, 1993.

Srihari, Sargur N., et al., "Pattern Recognition: A Survey", The Encyclopedia of Computer Science and Engineering, 3rd Ed., 1992.

* cited by examiner

*Primary Examiner*—Samir Ahmed
*Assistant Examiner*—Brian Q Le
(74) *Attorney, Agent, or Firm*—Fitzpatrick, Cella, Harper & Scinto (57) ABSTRACT

Methods and apparatus for creating a skeletal representation (400A) of a pixel image (100) composed of connected components (110 and 120). The skeletal representation (400A) is obtained by dividing each connected component (110) into a line segment having plural slices, calculating a minimal bounding rectangle (MBR) of each line segment, replacing each line segment with a thin line approximately formed by centroid pixels of the slices (112S) inside the MBR, and connecting the resulting thin lines (410 and 420). One of the many benefits of using the disclosed methods and apparatus is that the resulting thin lined graph (400A), i.e., the skeletal representation, is isomorphic to the original pixel image (100).

22 Claims, 6 Drawing Sheets

GRAPH BASED THINNING OF GRAPHICAL OBJECTS

This application is a continuation of Ser. No. 09/661,865 filed Sep. 14, 2000.

TECHNICAL FIELD

This invention pertains to the field of image analysis in computer systems, and, in particular, to improvements in graphical image feature extraction and skeletal representation. Accordingly, the general objects of the invention are to provide novel methods and apparatus of such character.

BACKGROUND ART

In the field of image analysis, thinning is a technique frequently used to extract meaningful features from graphical images for classifying objects. In computer geometry or mathematical morphology, there are several theoretical definitions of thinned objects (skeletons). The purpose of such thinning procedures is mainly to produce a less complex figure that might be used as an archetype for classification purposes. The idea of reducing a graphical object, such as a character or a drawing, to thin lines so that information relating to the object's actual shape is separated from accidental production errors (e.g., printing, scanning, hand drawing, compression-decompression, etc.) is very appealing. Currently, thinning is not feasible for thick objects, where the object and its thinned skeleton representations are not closely related, because different geometric shapes may engender the same skeleton. Nonetheless, important classes of graphical objects such as printed characters, engineering drawings, graphs, diagrams, etc. are typically thin objects and, therefore, do lend themselves to thinning procedures.

The field of skeletal representation of graphical objects is also presently restricted to instances in which the inaccuracies due to spurious branches created by thinning processes can be neglected. The problem of spurious branches is due to counterintuitive effects of current definitions and extreme sensitivity to small changes in the original object image.

It is hard to find a theoretical definition of a skeleton that overcomes these deficiencies. Consider, for example, the skeletal representation of a rectangle defined by the well-known medial axis algorithm. This skeleton follows the axis of symmetry of the rectangle (in accordance with intuition), but then bifurcates unexpectedly at each of the line ends. Slight irregularities of the rectangle edges in real images make things worse by adding new and erroneous branches. Such problems arise from the topological nature of the definition, which does not take into account the geometric shape of the object.

There are a large number of applications, such as document analysis, where there is a preferred orientation of an image. In this kind of application, the ability to recognize an object in its preferred position may overcome the above-noted deficiencies. Therefore, thinning procedures theoretically could be used in these applications because they do not have to rely on topology and need not be affine-invariant.

In order to overcome the above-noted deficiencies of the related art, it would be desirable to have improved procedures and apparatus that reduce to thin lines graphic objects pictured by a set of strokes (i.e., line segments). These thin lines would preferably keep the essential information about the geometric shape of the object, but do not have to be affine-invariant.

DISCLOSURE OF INVENTION

The present invention includes methods (500) and computer apparatus (620) for obtaining a skeletal representation (400A) of an image (100). Although the present invention is primarily described with reference to the processing of a single connected component (110) of an image (100), it can readily be extended to cover the processing an image (100) having multiple connected components (110 and 120) with exercise of ordinary skill in the art.

Figure 1:
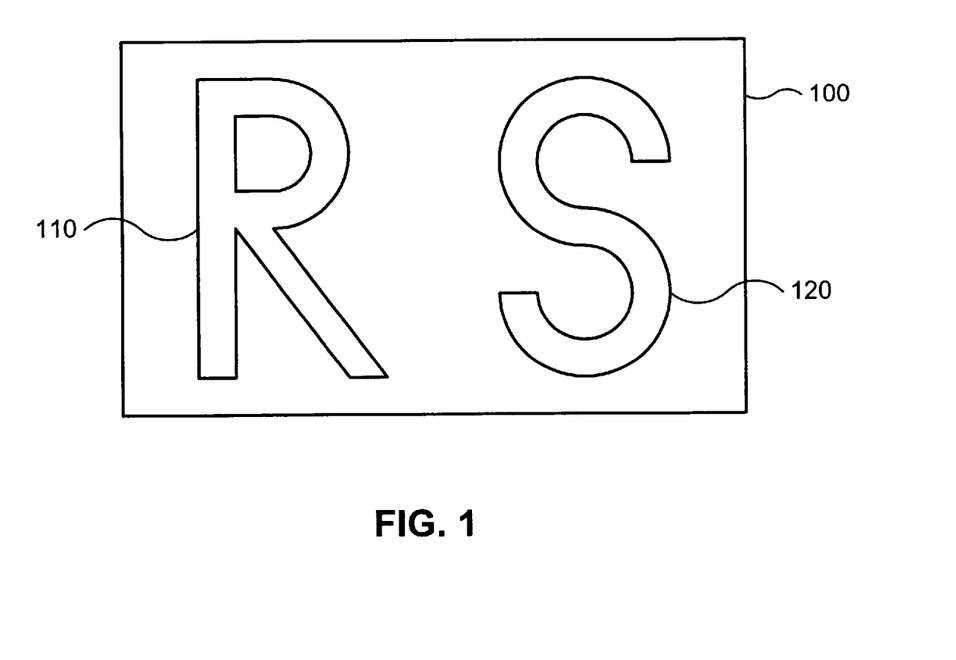
FIG. 1 is an illustration of a pixel image (100) including two connected components (110 and 120).

As shown in FIG. 1, a given connected component (110) of a multi-connected-component image (100) can be represented as a list of horizontal runs or slices (300), wherein each slice (300(i)) is represented by a node. An initial connected component graph (305) is produced by connecting with an edge (330) every two nodes (320 and 340) that represent slices (300(1) and 300(2)) adjacent to each other in the connected component (110). This initial connected component graph (305) can be converted into a collapsed component graph or L-Graph (305C) by replacing each maximal line-subgraph (368)(each line-subgraph corresponding to a line segment (112) of the connected component (110)) within the connected component graph (305) by a collapsed edge (368C). The resulting collapsed component graph or L-Graph (305C) representation is used to efficiently store, manipulate and/or transmit topological information about the connected component (110).

In accordance with the present invention, the connected component (110) is "thinned," i.e., converted into a skeletal representation, by (1) identifying a minimal bounding rectangle (MBR) (112A) of each line segment (112) in the connected component (110), (2) forming thin lines (112T, 410 and 420) by connecting at least substantially centroid pixels of the slices within each MBR (112A), and (3) connecting disconnected thin lines (410 and 420) using additional pixels (415) to make a thin-lined connected graph (400A) having the same connectivity as the connected component (110).

BRIEF DESCRIPTION OF THE DRAWINGS

These and other more detailed and specific features of the present invention are more fully disclosed in the following specification, in which reference is made to the accompanying drawings, in which.

DETAILED DESCRIPTION OF THE PREFERRED EMBODIMENTS

Figure 2:
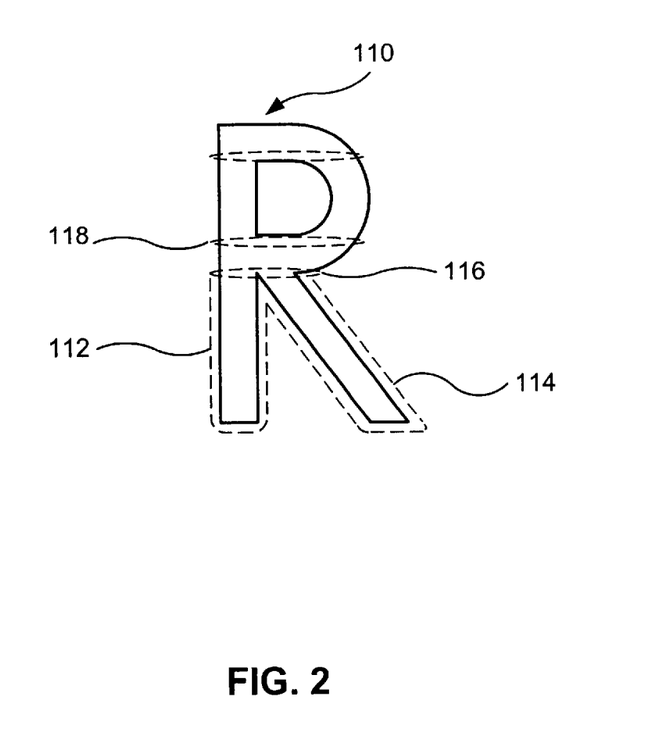
FIG. 2 is an illustration of a connected component (110) having linear segments (112 and 114) and a connective tissue (116) connecting the two line segments (112 and 114).

FIG. 1 is an illustration of a pixel image 100 consisting of two representative connected components 110 and 120. These are the letters R and S, respectively. FIG. 2 shows one of the connected components from FIG. 1, the letter R, 110. Inter alia, connected component 110 has a first linear segment 112, a second linear segment 114 and a connective tissue 116.

As a first step 510 of the overall process of thinning 500 (FIG. 5), an isolated connected component 100 is considered. Processes for segmenting or isolating connected components are known in the art. One such method is disclosed in co-pending U.S. patent application Ser. No. 09/149,732, filed on Sep. 8, 1998 and entitled "SEGMENTING AND RECOGNIZING BI-LEVEL IMAGES". This application is commonly assigned with the present application and is hereby incorporated by reference in its entirety into the present application.

Figures 3A, 3B:
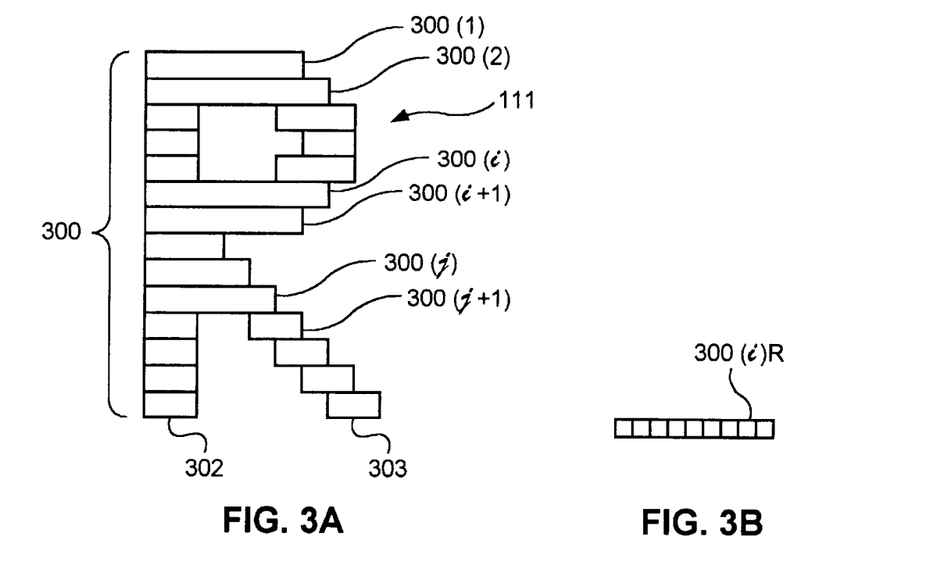
FIG. 3A is an illustration of a sliced model (111) (i.e., a connected component decomposed into horizontal pixel runs) of the connected component (110) shown in FIG. 2.
FIG. 3B is an illustration of a single slice (300(i)) represented as a horizontal pixel run (300(i)), slice (300(i)) being a part of the sliced model of FIG. 3A.

Usually, the isolation process provides lists of horizontal runs or slices 300 of image pixels of the same color (black or white) that belong to each of the connected components in the image. This is illustrated in FIG. 3A, which shows sliced model 111 of the connected component 110. As shown, the sliced model 111 of FIG. 3A includes not only the slices 300 but also the connectivity information among the slices 300. One way to represent the sliced model 111 is to express each of the slices 300 as a horizontal pixel run (i.e., a vector of adjacent pixels of the same color) such as pixel run 300(i). Then the sliced model 111 can be expressed as a connected component graph such as graph 305 illustrated in FIG. 3C. As shown a beginning slice, i.e., a top slice (300(1)), is denoted in the connected component graph 305 by a filled circle node 320. Slices 300 (i) and 300 (j) representing connective tissues 116 and 118 are denoted by crossed circular nodes 365 and 367. By contrast, end slices 302 and 303 are denoted in FIG. 3C by empty circular nodes 375 and 380. The rest of the slices are denoted by square nodes including node 340.

Figure 3C:
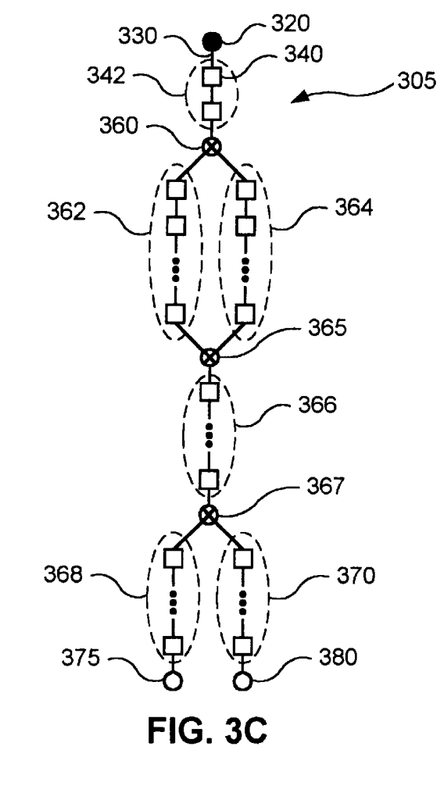
FIG. 3C is an illustration of a connected component graph (305) produced by converting the sliced model (111) illustrated in FIG. 3A.
Figure 3D:
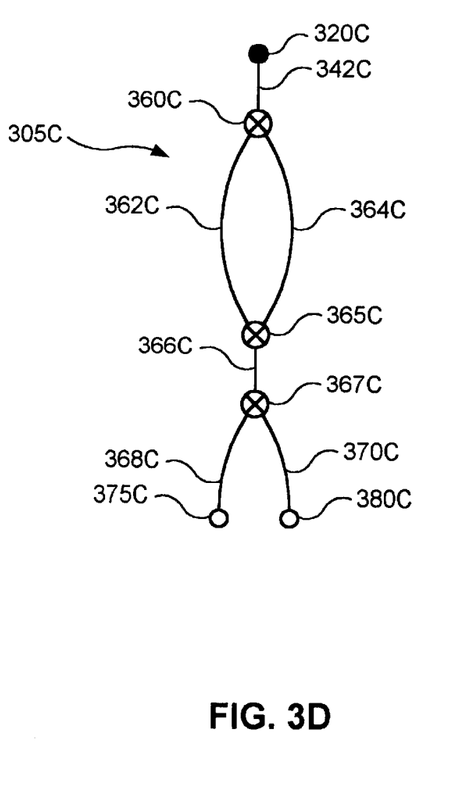
FIG. 3D is an illustration of a collapsed component graph or L-Graph (305C) produced by converting the connected component graph (305) illustrated in FIG. 3C.

FIG. 3D shows a collapsed component graph 305C (also called a lumped graph or an L-Graph). It is obtained by replacing maximal line-subgraphs 342, 362, 364, 366, 368 and 370 of the connected component graph 305 with generic edges (called "collapsed edges") 342C, 362C, 364C, 366C, 368C and 370C, respectively to produce graph 305C as shown in FIG. 3D. The collapsed component graph (305C) representation, which is preferably encoded in one of the many known computer programming languages as an L-Graph object, is one representation used to efficiently store topological information about the connected component (110).

Details of converting the sliced model 111 into a connected component graph (305) and ultimately into graph 305C are described in U.S. patent application Ser. No. 09/661,865, entitled "RECOGNITION AND CLUSTERING OF CONNECTED COMPONENTS IN BI-LEVEL IMAGES," filed on Sep. 14, 2000 and commonly assigned with the present application; this application is hereby incorporated by reference in its entirety into the present application.

A line-subgraph is defined in this application as a maximal length path of a graph such that the path vertices do not have incident edges outside of the path. Terminal vertices of the path are excluded from the line-subgraph definition. A line-subgraph is a maximal sequence of alternating vertices and edges in a graph such that each vertex has two incident edges. When the number of vertices of a line-subgraph is N, the number of edges is N+1. Additional background on terminology used in this application may be found in: N. Deo, *Graph Theory with Applications to Engineering and Computer Science*, 1 Prentice-Hall, Englewood Cliffs, N.J., 1374, Chs. 1,2.

Figure 4A:
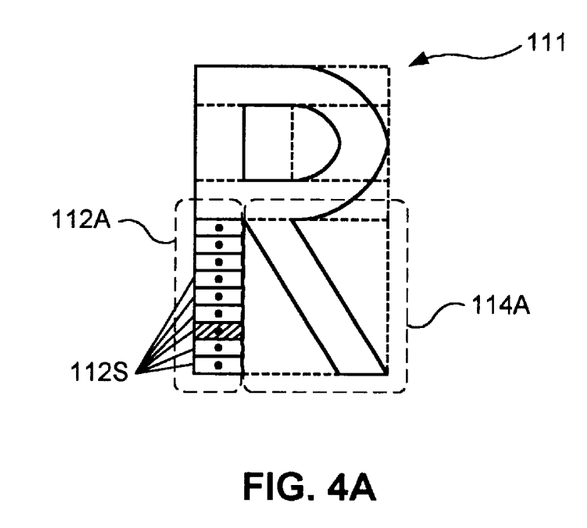
FIG. 4A is an illustration of minimal bounding rectangles (MBRs) (112A and 114A) bounding line segments of the connected component illustrated in FIG. 3A.

In a next step 520 (FIG. 5) of the method 500, the sliced model 111 is divided into line segments, e.g., 112 and 114 (FIG. 2), and respective minimal bounding rectangles (MBRs) 112A and 114A are computed for the linear segments 112 and 114. FIG. 4A illustrates MBRs around each line segment of the sliced model 111.

In a next step 530 (FIG. 5), a thin line, (e.g., with a width of one or two pixels) corresponding to each line segment is preferably obtained by connecting at least substantially centroid pixels of the slices within the surrounding minimal bounding rectangle. In a particularly preferred embodiment each thin line is M pixels wide (where M is a non-negative integer) and is most preferably between 1 and 4 pixels wide.

Figure 4B:
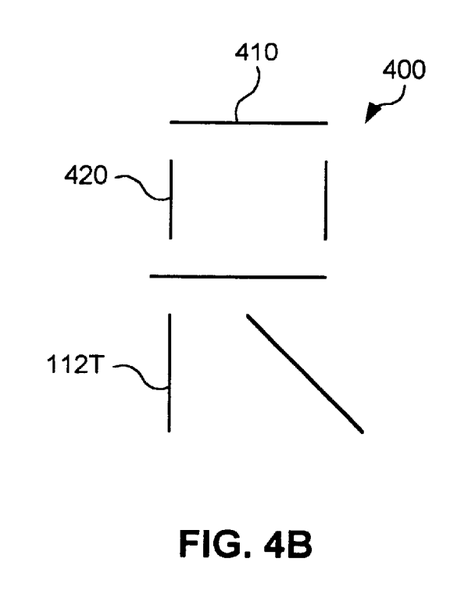
FIG. 4B is an illustration of a thin-lined unconnected graph (400) obtained by connecting centroid pixels of the MBRs shown in FIG. 4A, in accordance with the present invention.

FIG. 4B illustrates linear segment 112T, in which the linear segment 112 (FIG. 2) is horizontally sliced, and dots inside slices 112S of segment 112 (FIG. 4A) depict centroids of the slices 112S. FIG. 4B also illustrates the result of connecting the centroid pixels of the linear segment 112A to thereby form thin line 112T. As illustrated in FIG. 4B, when a thin line for each of the linear segments of connected component 110 is obtained, the resulting graph 400 is not isomorphic to the connected component 110. In other words, the graph 400 does not have the same connectivity as the connected component 110.

Figure 4C:
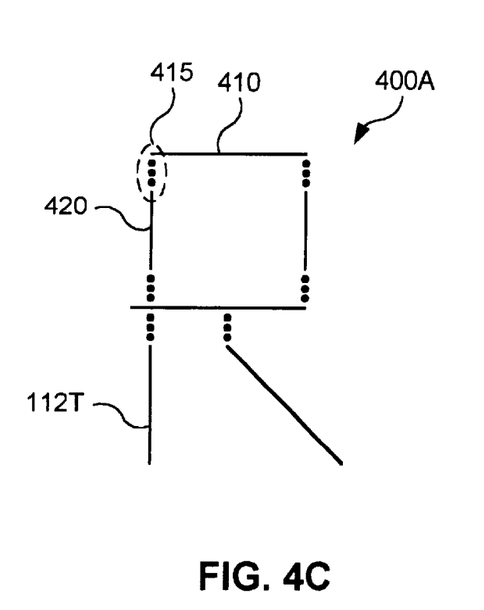
FIG. 4C is an illustration of a thin-lined connected graph (400A) obtained by connecting some of the thin lines of the thin-lined unconnected graph shown in FIG. 4B, in accordance with the present invention.
Figure 5:
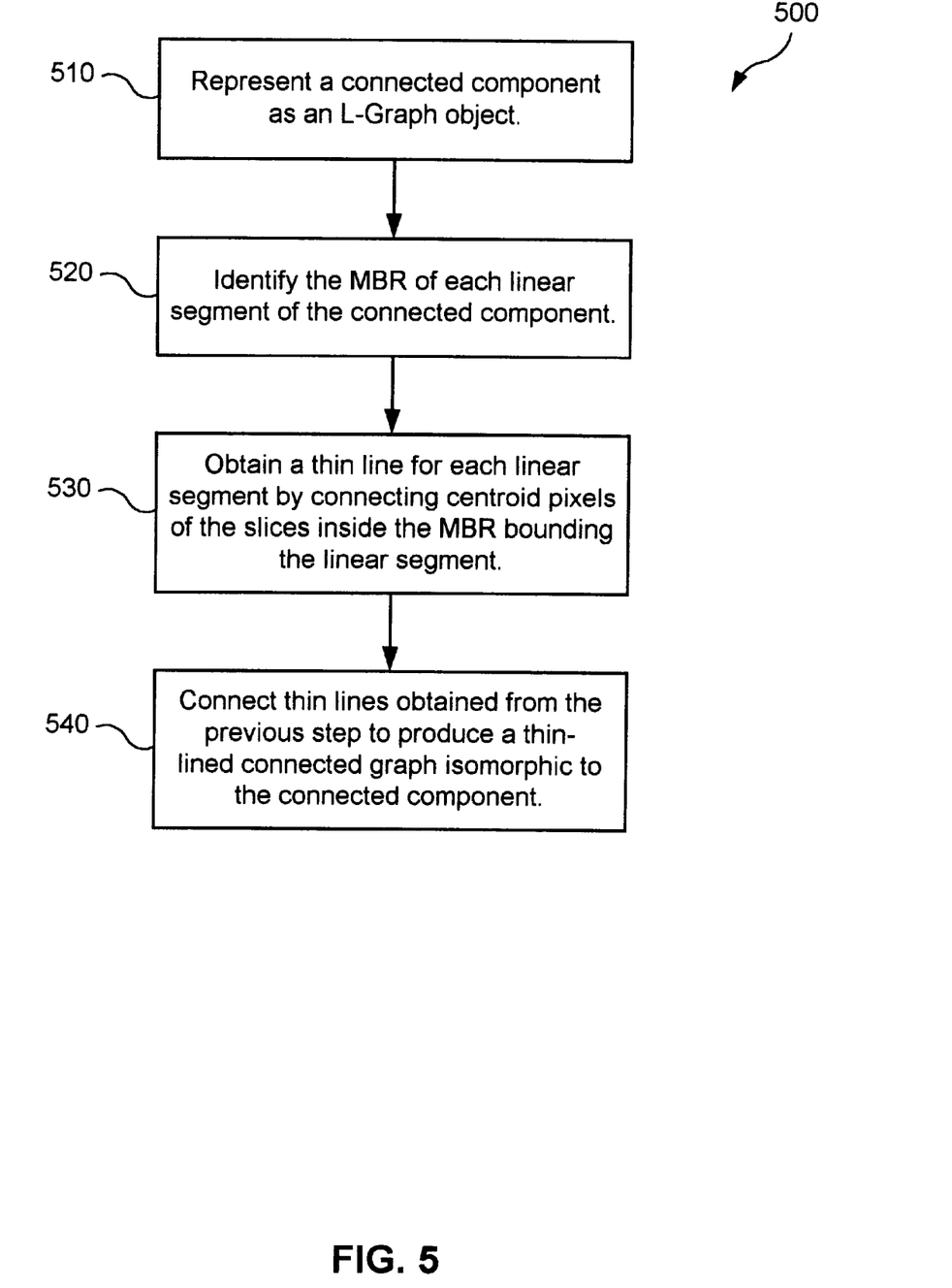
FIG. 5 is a flowchart (500) illustrating method steps (510, 520, 530 and 540) in accordance with the present invention.

As shown in FIG. 5, the last step 540 of the overall process of thinning 500 augments the graph 400 with additional pixels (e.g., pixels 415) to connect the thin lines (e.g., lines 410 and 420), so that a resulting thin-lined graph 400A (FIG. 4C) is an isomorphic skeletal representation of the original connected component 110.

Figure 6:
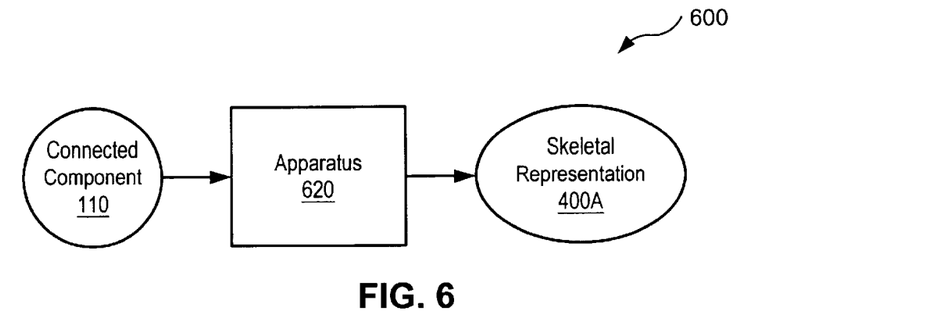
FIG. 6 is a high-level block diagram (600) illustrating the use of an apparatus (620) in accordance with the present invention.

FIG. 6 is a block diagram 600 of an apparatus 620 in accordance with one preferred embodiment of the present invention, the diagram representing apparatus 620 at the highest abstraction level. As shown, apparatus 620 receives the connected component 110 as an input, and produces a skeletal representation 400A (illustrated in FIG. 4C) as an output.

Figure 7A:
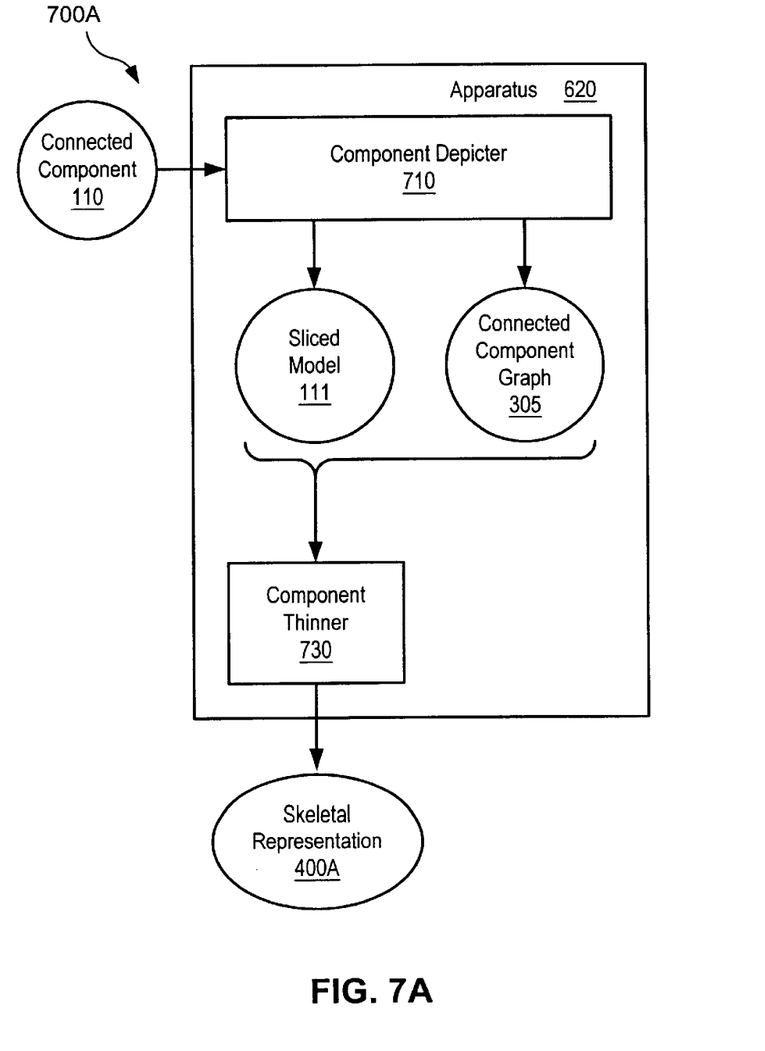
FIG. 7A is a more detailed block diagram (700A) showing in greater detail the elements of the apparatus (620) illustrated in FIG. 6.

FIG. 7A illustrates one possible embodiment 700A of the apparatus 620 (FIG. 6), this figure showing elements constituting the apparatus 620. As shown, the apparatus 620 includes a component depicter 710, which receives the image of a connected component 110 and produces the sliced model 111 (FIG. 3A) and the connected component L-Graph 305 (FIG. 3C). Apparatus 620 also includes a component thinner 730, which receives the sliced model 111 and the L-Graph and produces the skeletal representation 400A.

Figure 7B:
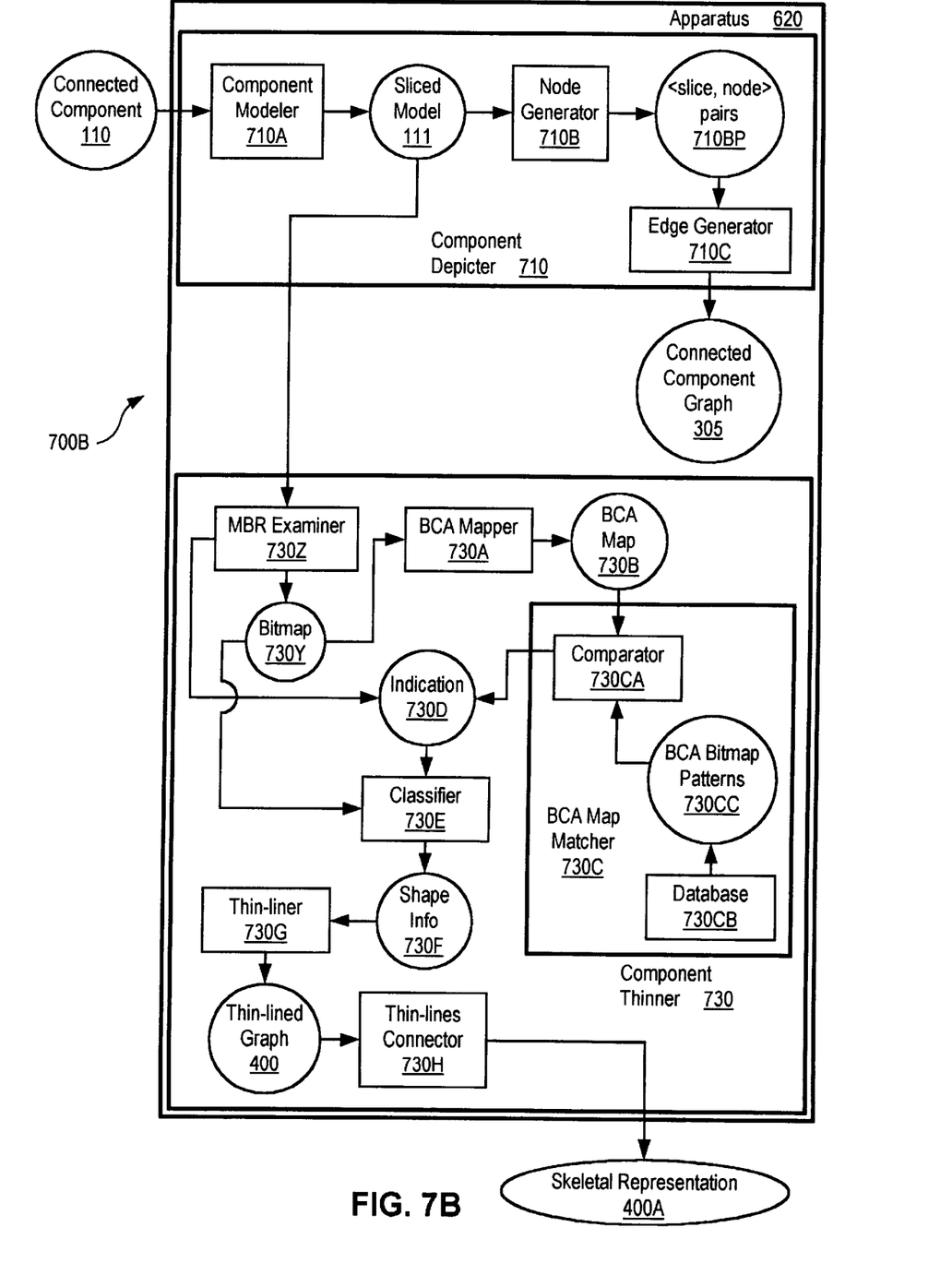
FIG. 7B is a still more detailed block diagram (700B) showing in greater detail the modules illustrated in FIG. 7A.

FIG. 7B is a more detailed representation 700B of the apparatus 620 shown in FIG. 7A. Shown inside the component depicter 710 are three elements: a component modeler 710A, a node generator 710B and an edge generator 710C. The component modeler 710A takes the connected component image 110 and produces the sliced model 111. The node generator 710B takes the sliced model 111 and produces <slice, node> association pairs 710BP by generating a new node for each slice (300(i)) of the sliced model 111, and associating the node with the slice (300(i)). The edge generator 710C takes the <slice, node> association pairs 710BP and produces the connected component graph 305 by generating a new edge and connecting with the edge every two nodes belonging to the <slice, node> association pairs 710BP whenever the two slices associated with the two nodes are adjacent to each other (i.e.—when they are in adjacent rows and are aligned with each other within the sliced model 111).

In the preferred apparatus representation 700B, the component thinner 730 includes six elements: a BCA (Box Connectivity Approach) mapper 730A, a BCA Map Matcher 730C, a Classifier 730E, a Thin-liner 730G, a Thin-lines Connector 730H, and an MBR Examiner 730Z. The MBR Examiner 730Z computes an MBR for each of the line segments of the sliced model 111 and decides whether a bitmap 730Y inside each MBR should be matched, via BCA mapping (explained below), against bitmap patterns 730CC stored in a database 730CB. Alternatively, the bitmap 730Y should be characterized to have the shape of the MBR itself. If the bitmap 730Y should be matched against the bitmap patterns 730CC, the bitmap 730Y is passed to the BCA mapper 730A; if not, a null value indication 730D is produced and passed to the classifier 730E.

The MBR Examiner 730Z makes such a decision using the two steps below, where a filling factor (FF) of the bitmap 730Y is computed by dividing the number of pixels of a single color (preferably black) by the number of all pixels in the bitmap, and an aspect ratio is computed by dividing the height (H) by the width (W) of the bitmap.

Step 1. If the FF is less than a certain threshold value (e.g., FF<0.8), the linear segment is classified by matching the bitmap of the linear segment to the BCA bitmap patterns 730CC via BCA mapping.

Step 2. If the FF is greater than or equal to the threshold value (e.g., FF≧0.8), the linear segment is considered to have the shape of its MBR (or the bitmap), which is classified as: (1) a patch (if the MBR is small enough or approximately square), (2) a horizontal stroke (if the aspect ratio is less than a certain threshold, e.g., H/W<0.8), or (3) a vertical stroke (if the aspect ratio is greater than a certain threshold, e.g., H/W>1.2).

When the FF is less than a set threshold value, the MBR Examiner 730Z sends the bitmap 730Y to the BCA Mapper 730A for classification. The BCA mapper 730A takes the bitmap 730Y and produces a BCA map 730B by BCA-mapping the bitmap 730Y into a BCA map. BCA mapping is one way to map a rectangular bitmap into a square bitmap of a preset size, say, 8×8 or 16×16. It is used as a step to simplify the rectangular bitmap pattern, while maintaining the basic features of the bitmap, before classifying the bitmap pattern, i.e., performing feature extraction. The resulting square bitmap is called a BCA map. BCA-mapping is described in detail in U.S. Pat. No. 5,539,840, entitled "MULTIFONT OPTICAL CHARACTER RECOGNITION USING A BOX CONNECTIVITY APPROACH," issued on Jul. 23, 1996; this patent is hereby incorporated by reference in its entirety.

The BCA Map Matcher 730C takes the BCA map 730B and produces a YES/NO indication 730D as to whether the BCA map 730B matches one of the BCA map patterns 730CC stored on a database 730CB, which is illustrated as included within the BCA Map Matcher 730C. The database 730CB, however, may be placed outside the BCA Map Matcher 730C without significantly changing the functionality of the embodiment 700B. The BCA Map Matcher 730C also includes a comparator 730CA, which performs the actual matching of the BCA map 730B to the BCA bitmap patterns 730CC. Comparator 730CA then produces the YES/NO indication 730D, where the indication 730D has a YES value (e.g., a value indexing one of the BCA bitmap patterns 730CC) if the BCA map 730B matches one of the BCA map patterns 730CC, or a NO value (e.g., a byte value for character "0" (zero)) for no match.

The classifier 730E takes the YES/NO indication 730D and produces a shape information 730F of the linear segment represented by the bitmap 730Y. If there was a match between the BCA map 730B and one of the BCA bitmap patterns 730CC, the YES value 730D taken by the classifier 730E is used to retrieve the shape information 730F. If there was no match, the NO value (i.e., a null value) 730D taken by the classifier 730E indicates to the classifier 730E that the shape of the MBR bounding the bitmap 730Y should be the shape information 730F. The bitmap 730Y is inputted to the classifier 730E when there was no match, so that the shape of the MBR surrounding the bitmap 730Y can be computed by the classifier 730E.

When the bitmap of a line segment 730Y is BCA-mapped by the BCA Mapper 730A to a BCA map 730B and the BCA map 730B does not match any of the BCA bitmap patterns 730CC stored in the database 730CB, it is considered that black pixels are evenly distributed across the bitmap 730Y. If this is the case the linear segment is considered to have the shape of its MBR according to Step 2 above even though the bitmap's FF is less than a set threshold value The Thin-liner 730G accumulates the shape information 730F for all line segments of the slice model 111, and produces the thin-lined graph 400 by deriving thin lines from the shape information 730F of all the line segments. The Thin-lines Connector 730H takes the thin-lined graph 400 and the connected component graph 305 which has the connectivity information of the connected component 110, and produces the skeletal representation 400A of the sliced model 111 (i.e., the connected component 110)by connecting unconnected thin-lines as appropriate (e.g., thin-lines 410 and 420) using additional pixels 415 (FIG. 4C). In an alternative embodiment, the Thin-lines Connector 730H takes the collapsed component graph 305C instead of the connected component graph 305 to access the connectivity information heeded to produce the skeletal representation 400A.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

For example, it should be noted that while the apparatus of the present invention illustrated in FIGS. 6, 7A and 7B may be embodied in its entirety as hardware, alternative embodiments of the present invention are possible. In such alternative embodiments, any of the modules depicted in the various figures can be fabricated of software, firmware, and/or hardware elements.

What is claimed is:

1. A method for obtaining a skeletal representation of a connected component of a pixel image, the connected component comprising at least one line segment, the method comprising the steps of:

depicting the connected component as a connected graph, said step of depicting comprising:
modeling the connected component by dividing the connected component into slices;
representing each slice by one of a set of nodes; and
connecting two of the nodes with an edge when two of the slices represented by the two nodes are adjacent to each other within the connected component, wherein the nodes and the edges constitute at least a part of the connected graph; and thinning the connected component, said step of thinning comprising:
replacing each line segment of the connected component with a thin-line segment, having a width of M pixels, where M is a non-negative integer; and
connecting every first thin-line that is not connected to any other thin-line to a second thin-line, to produce the skeletal representation, the step of connecting comprising:
adding N pixels that are not part of any thin-line to connect the first thin-line to the second thin-line, where N is a natural number;
wherein the step of connecting results in a thin connected graph which includes all thin-lines, and the thin connected graph is isomorphic to the connected component.

2. The method of claim 1, wherein the substep of modeling further comprises:
expressing slices as pixel runs, respectively.

3. The method of claim 1, wherein pixels of the thin-line approximately overlap with centroid pixels of the slices constituting the line segment that corresponds to the thin-line.

4. The method of claim 1, wherein N is a minimal number of pixels necessary to connect the first thin-line to the second thin-line.

5. The method of claim 1 wherein the connected graph includes at least one maximal line subgraph, the method further comprising the steps of:
translating the connected graph into a collapsed component graph having plural collapsed edges by replacing each maximal line subgraph of the connected graph with a collapsed edge.

6. The method of claim 5 further comprising the steps of:
representing the collapsed component graph by a linked list data structure, the step of representing comprising:
assigning a sequential order to nodes in the collapsed component graph; and creating the linked list including data structures of the nodes according to the sequential order.

7. The method of claim 6, wherein the substep of assigning comprises:
ordering the nodes in the collapsed component graph from top to bottom, and from a leftmost branch to a rightmost branch when there are multiple branches in the collapsed component graph.

8. The method of claim 5 further comprising the steps of:
encoding a representation of the collapsed component graph as a data structure in a computer programming language.

9. The method of claim 1, wherein all line segments of the connected component are thin and elongated.

10. The method of claim 1, wherein the step of thinning further comprises:
BCA-mapping a bitmap delimited by a minimal bounding rectangle (MBR) of each line segment into a bitmap of a set standard size, called a BCA map.

11. The method of claim 10, wherein the step of thinning further comprises:
determining whether the bitmap matches one of a set of BCA maps stored in a database;
classifying each line segment as a shape associated with one of the BCA maps in response to the bitmap corresponding to that line segment matching one of the BCA maps; and
classifying the line segment to have a shape of the corresponding MBR in response to the corresponding bitmap matching none of the BCA maps.

12. The method of claim 1, where M is a positive integer less than 4.

13. An apparatus for producing a skeletal representation of a connected component of a pixel image, the connected component comprising at least one line segment, the apparatus comprising:

a component depicter that receives the connected component as input, and produces a connected graph and slices representing the connected component; and a component thinner, coupled to the component depicter, that receives the slices as input and produces the skeletal representation of the connected component, the component thinner comprising:
a thin-liner that replaces each line segment of the connected component with a thin line segment, called a thin-line, having a width of M pixels, where M is a non-negative integer; and
a connector that connects every first thin-line that is not connected to any other thin-line to a second thin-line to produce the skeletal representation, the connector comprising:
an adder that adds N pixels that are not part of any thin-line to connect the first thin-line to the second thin-line, where N is a natural number;
wherein connecting results in a thin connected graph which includes all thin-lines, and the thin connected graph is isomorphic to the connected component.

14. The apparatus of claim 13, wherein the component depicter comprises:
a component modeler that receives the connected component as input and produces slices representing the connected component;
a node generator coupled to the component slicer, wherein the node generator receives the slices as input, generates nodes, and associates the nodes with the slices, respectively; and
an edge generator coupled to the-node generator, wherein the edge generator receives the nodes as input, generates an edge for every pair of nodes associated with two of the slices adjacent to each other within the connected component, and connects the pair of nodes with the edge to produce the connected graph consisting of the nodes and the edges.

15. The apparatus of claim 14, wherein the component modeler represents each of the slices with a pixel run.

16. The apparatus of claim 13, wherein pixels of the thin-line approximately overlap with centroid pixels of the slices constituting the line segment that corresponds to the thin-line.

17. The apparatus of claim 13 further comprising:
a graph translator coupled to the component depicter, wherein the graph translator receives the connected graph as input from the component depicter, and translates the connected graph into a collapsed component graph.

18. The apparatus of claim 17 further comprising:
a graph encoder coupled to the graph translator, wherein the graph encoder receives the collapsed component graph as input from the graph translator, and encodes a representation of the collapsed component graph as a data structure in a computer programming language.

19. The apparatus of claim 13, wherein the component thinner further comprises:
a BCA mapper that BCA-maps a bitmap delimited by a minimal bounding rectangle (MBR) of the line segment into a bitmap of a set standard size, called a BCA map.

20. The apparatus of claim 19, wherein the component thinner further comprises:
a BCA map matcher coupled to the BCA mapper, wherein the BCA map matcher receives the bitmap as input from the BCA mapper and comprises:
a database that stores BCA maps; and
a comparator coupled to the BCA mapper and to the database, wherein the comparator receives as inputs the bitmap and the BCA maps, compares the bitmap to each of the BCA maps, and produces a result of whether the bitmap matches one of the BCA maps; and
a classifier coupled to the BCA map matcher, wherein the classifier receives the result as input, and classifies the shape of the line segment, wherein:
the classifier classifies the line segment as a shape associated with one of the BCA maps in response to the result indicating a match; and
the classifier classifies the line segment to have a shape of the MBR in response to the result indicating no match.

21. A computer-readable medium containing a computer program for producing a skeletal representation of a connected component of a pixel image, the connected component comprising at least one line segment, the program comprising:

a depiction module that receives the connected component as input, and produces a connected graph and slices representing the connected component; and
a thinner module that receives slices as input and produces the skeletal representation of the connected component, the thinner module comprising:
a thin-liner module that replaces each line segment of the connected component with a thin-line segment, having a width of M pixels, where M is a non-negative integer; and pixels of the thin-line at least substantially overlap with centroid pixels of pixel runs constituting the line segment that corresponds to the thin-line; and
a connecting module that connects every first thin-line that is not connected to any other thin-line to a second thin-line, to produce the skeletal representation, the connecting module comprising:
an adding module that adds N pixels that are not part of any thin-line to connect the first thin-line to the second thin-line, where N is a natural number;
wherein connecting results in a thin connected graph which includes all thin-lines, and the thin connected graph is isomorphic to the connected component.

22. The computer-readable medium of claim 21, wherein the depiction module comprises:
a modeler module that receives the connected component as input and outputs slices representing the connected component;
a node generator module in communication with the modeler module, wherein the node generator module receives the slices as input from the modeler module, and generates nodes associated with the slices, respectively; and
an edge generator module in communication with the node generator module, wherein the edge generator module receives nodes as input, generates an edge for every pair of nodes associated with two of the slices adjacent to each other within the connected component, and connects the pair of nodes with the edge to produce the connected graph consisting of the nodes and the edges.

* * * * *

UNITED STATES PATENT AND TRADEMARK OFFICE
CERTIFICATE OF CORRECTION

PATENT NO. : 6,788,814 B1
DATED : September 7, 2004
INVENTOR(S) : Radovan V. Krtolica It is certified that error appears in the above-identified patent and that said Letters Patent is hereby corrected as shown below:

Column 6,
Line 52, "heeded:" should read -- needed --.

Signed and Sealed this

Eleventh Day of January, 2005

JON W. DUDAS
*Director of the United States Patent and Trademark Office*